Patented Oct. 8, 1946

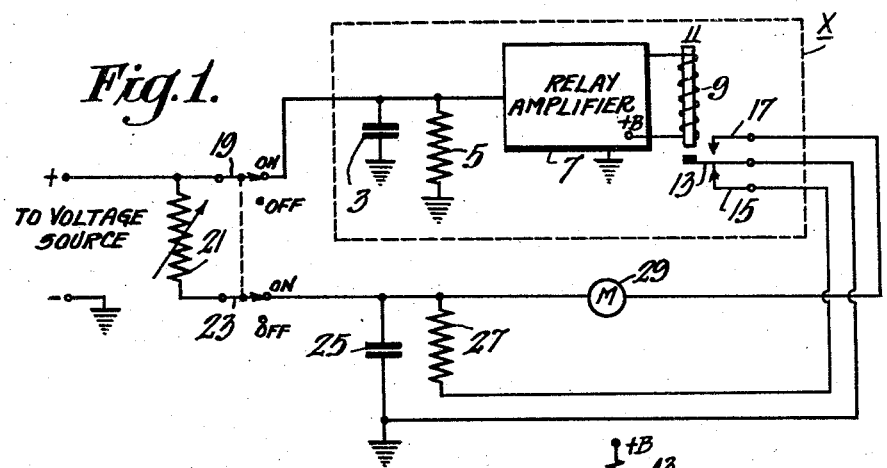
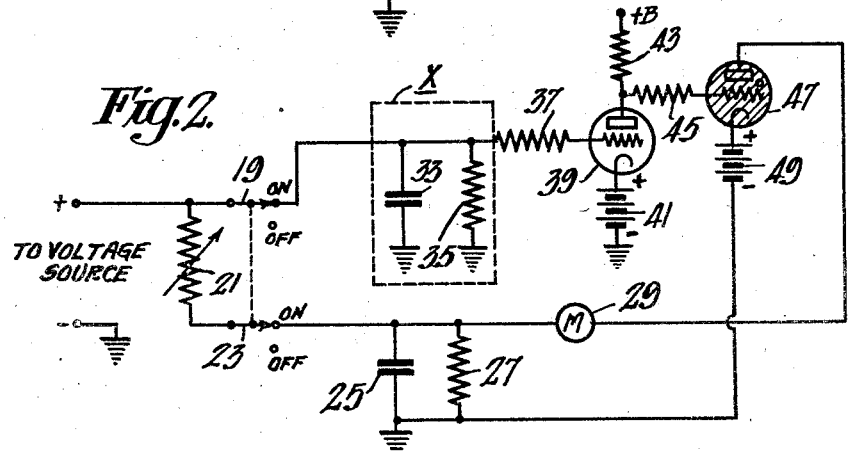
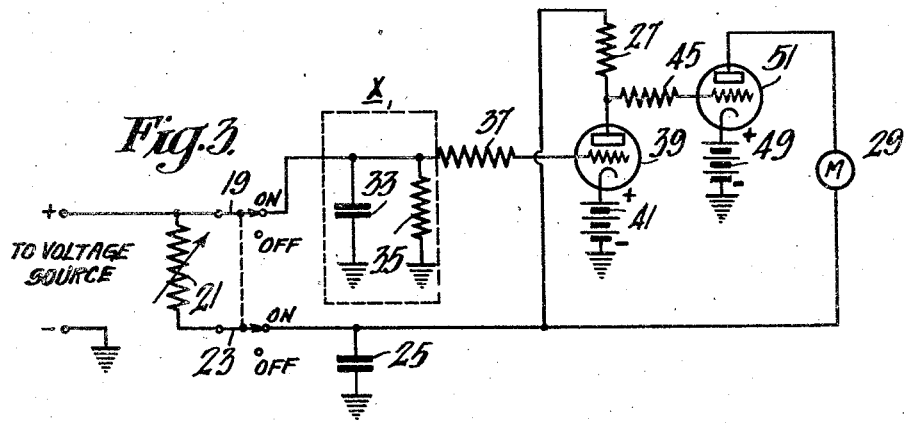

2,408,727

UNITED STATES PATENT OFFICE 2,408,727

MEANS FOR CIRCUIT TIME CONSTANT MEASUREMENT

Daniel Blitz, Princeton, N. J., assignor to Radio Corporation of America, a corporation of Delaware Application July 11, 1944, Serial No. 544,448

8 Claims. (Cl. 161—15)

This invention relates generally to the testing and measuring of operating characteristics of electrical circuits and more particularly to an improved method of and means for measuring the time constant or delay time of electrical networks.

In the design, manufacture and testing of complex electrical systems such as are employed for remote control, telemetering, and radar, for example, it frequently is necessary to determine and maintain within predetermined limits the effective time constants or delay times of predetermined circuit components. While the time constant of simple reactive circuits may be calculated from the known circuit parameters, a simple and reasonably accurate method of determining the effective time constants or delay times of more complex networks is extremely advantageous.

The present invention provides several embodiments of an improved method of and means for employing the known discharging characteristics of a capacitor for measuring the time constant or delay time of an independent electrical network which may include electro-mechanical components. The invention is particularly advantageous for testing and matching the time constants or delay times of complex electrical networks in conventional quantity production. For the purpose of simplifying the description of the instant invention, the term "time constant" is employed herein as inclusive of the more generic term "delay time" for complex circuits.

Among the objects of the invention are to provide an improved method of and means for measuring the operating characteristics of an electrical network. Another object of the invention is to provide an improved method of and means for testing and matching the time constant or delay time characteristics of a plurality of electrical devices. A further object of the invention is to provide an improved method of and means for measuring the time constant or delay time of an electrical network as a function of the discharging characteristics of an independent reactive measuring network. An additional object of the invention is to provide an improved method of and means for measuring the effective time constant or delay time of an electrical network which includes an electromechanical device.

Another object of the invention is to provide an improved method of and means for employing the discharging characteristics of a capacitor for measuring the time constant of an independent electrical network wherein said capacitor and said network are deenergized simultaneously until said network attains a predetermined electrical condition, and wherein the time constant of said network is indicated as a function of the residual charge on said capacitor.

The invention will be described in greater detail by reference to the accompanying drawing of which Figure 1 is a schematic circuit diagram of one embodiment of the invention adapted to the measurement of the effective time constants of an electrical network which includes an electromechanical device, Figure 2 is a schematic circuit diagram of a second embodiment of the invention, and Figure 3 is a schematic circuit diagram of a third embodiment of the invention. Similar reference characters are applied to similar elements throughout the drawing.

Figure 1 of the drawing shows a complex electrical network X which, for example, may include a capacitor 3 and a resistor 5 connected in parallel across the input circuit of a conventional relay amplifier 7 which is connected to energize the winding 9 of a relay 11. The relay 11, for example, may include a movable contact 13 and two fixed contacts 15, 17 arranged to provide a single-pole double-throw switch actuated by the relay armature.

The positive terminal of a source of voltage, not shown, is connected through a first switch 19 to the ungrounded input terminal of the network X. The negative terminal of the voltage source is grounded. The positive terminal of the voltage source also is connected through a variable resistor 21 and a second switch 23 to the common terminals of a storage capacitor 25, a discharge resistor 27 and an indicating meter 29. The first and second switches 19 and 23 preferably should be ganged for simultaneous operation.

The remaining terminal of the storage capacitor 25 is grounded. The remaining terminal of the discharging resistor 27 is connected to the fixed contact 15 which normally is in contact with the movable contact 13 of the relay 11 when the relay is deenergized. The remaining terminal of the indicating meter 29 is connected to the remaining fixed contact 17 of the relay 11. Energization of the relay winding 9 by current derived from the relay amplifier 7 opens the relay contacts 13, 15 and closes the relay contacts 13, 17.

In operation, when the switches 19, 23 are closed, the capacitors 3 and 25 are charged to the same or different voltages provided by the input voltage source. When the switches 19, 23 are opened simultaneously, the capacitor 3 discharges through the resistor 5, providing a voltage change to a value which actuates the relay amplifier to energize the relay winding 9, thereby opening the relay contacts 13, 15 and closing the relay contacts 13, 17. Simultaneously, the storage capacitor 25 discharges through the discharging resistor 27 until such time as the relay contacts 13, 15 are opened. At a slightly later interval, the relay contacts 13, 17 are closed, thereby discharging the residual charge on the storage capacitor 25 through the indicating meter 29 and providing an indication thereon which is a function of said residual charge.

If the time constant of the measuring circuit 25, 27 is appreciably longer than the effective time constant of the network X (as determined between the instant that the switch 19 is opened and the instant that the relay contacts 13, 15 are opened), the indication provided on the meter 29 will be a function of the operating interval of the network X.

It should be understood that the particular network X has been selected merely for the purpose of illustration, and that it may be varied as desired. In the particular arrangement disclosed herein, it should be understood that the relay amplifier or relay armature may be self-locking in order that the contacts 13, 17 may remain closed after the initial energization of the relay winding. Either a gas tube relay amplifier or a polarized relay may be employed for this purpose in any manner known in the art.

If the operating time of the relay 11 is negligible as compared to the time constant of the remainder of the network X, the indications provided by the meter 29 may be employed to indicate directly the time constant of the non-mechanical elements of the network. In any event, however, the time constant of the measuring network 25, 27 should be longer than the longest time constant to be measured. The variable resistor 21 may be adjusted, or a separate voltage source may be employed, to provide variation of the effective sensitivity of the indicating meter 29.

If neither relay amplifier or relay are polarized to provide self-locking of the relay armature after the relay winding 9 is energized in response to the voltage change in the input circuit of the relay amplifier, the movable contact 13 should make contact with the fixed contact 17 for an interval sufficiently long to permit complete dissipation of the residual charge on the storage capacitor 25 through the indicating meter 29.

In Figure 2 the network X, of which the time constant is to be determined, is shown, by way of illustration, as comprising a parallel-connected capacitor 33 and resistor 35. The positive terminal of the voltage source is connected through the switch 19 to the ungrounded terminals of the capacitor 33 and resistor 35, and also is connected through a high isolating resistor 37 to the control electrode of a first amplifier tube 39. The cathode of the amplifier tube 39 is connected through a first battery 41 which biases the cathode positively with respect to ground. The anode of the amplifier tube 39 is connected through an anode resistor 43 to a source of anode voltage, not shown. The anode of the first amplifier tube 39 also is connected through a second isolating resistor 45 to the control electrode of a gaseous discharge second amplifier tube 47, the cathode of which is connected through a second biasing battery 49 to ground. The positive terminal of the input voltage source is connected through the variable resistor 21 and the second switch 23 to the ungrounded terminals of the storage capacitor 25 and discharge resistor 27, and also is connected through the meter 29 to the anode of the gaseous discharge amplifier tube 47.

In operation, when the switches 19 and 23 are closed, the input voltage charges the capacitors 33 and 25 and applies the input potential to the control electrode of the first amplifier tube 39, and through the meter 29 to the anode of the gaseous discharge tube 47. The cathode battery 41 determines the cut-off grid voltage for the first amplifier tube 39. Since the first amplifier tube 39 is conducting, the grid of the gaseous discharge tube 47 is maintained at cutoff potential by means of the cathode battery 49 whereby no anode current flows through the gaseous discharge tube 47.

When the switches 19, 23 are opened, the voltages across the capacitors 33 and 25 drop at rates dependent upon the relative time constants of the network X and the measuring network 25, 27, thereby decreasing the voltage applied to the grid of the first amplifier tube 39 until the tube anode current is cut off. When the first amplifier tube 39 cuts off, a positive potential is applied to the grid of the gaseous discharge tube 47, causing the tube to conduct and thereby to discharge the residual charge upon the storage capacitor 25 through the meter 29. The resultant pulse of current through the meter 29 thereby provides an indication of the time constant of the network X, as described heretofore in the circuit of Figure 1. When the meter receives the residual charge upon the storage capacitor 25, the discharge resistor 27 merely acts as a shunt across the meter and the conducting gaseous discharge tube.

The circuit of Figure 3 is similar to the circuit of Figure 2 with the exception that a conventional thermionic tube 51 is substituted for the gaseous discharge tube 47 of the previous circuit, and the first amplifier tube 39 is effectively connected in series with the discharge resistor 27.

When the switches 19 and 23 are closed, the capacitors 33 and 25 are charged to the input potential and a positive bias is applied to the grid of the first amplifier tube to provide a conducting path therethrough for the storage capacitor discharge circuit which includes the discharge resistor 27. Since the first amplifier tube 39 is conducting, the grid of the second amplifier tube 51 is maintained at cutoff potential due to the biasing action of the cathode battery 49 connected between the cathode of the second amplifier tube and ground. Since the second amplifier tube 51 is cut off, no current flows through the meter 29.

When the switches 19 and 23 are opened, the capacitors 33 and 25 discharge through the resistors 35 and 27, respectively, until such time as the voltage on the first amplifier tube 39 drops below cutoff value as determined by the first cathode battery 41 connected between the cathode of said tube and ground. When the anode current through the first amplifier tube 39 cuts off, the discharge path for the storage capacitor 25 through the discharge resistor 27 is opened, and a positive potential is applied to the grid of the second amplifier tube, causing it to conduct and to discharge the residual charge upon the storage capacitor 25 through the meter 29, to provide an indication of the time constant or delay time of the network X as described heretofore in the circuits of Figures 1 and 2. It is noted that the circuit of Figure 3 does not require a separate anode voltage source for the first amplifier tube, and the discharge resistor 27 is effectively disconnected from the storage capacitor 25 during the interval when the meter indicates the residual charge thereon.

Thus the invention described comprises several embodiments of an improved method of and means for measuring, over a relatively wide range, the effective time constant or delay time of an electrical network which may, if desired, include electromechanical devices. The circuits described provide convenient, rapid, and relative accurate indications of the time constant of a network under measurement. The indicating meter in each circuit may be calibrated in any desired manner, or if desired, an alarm or other device may be substituted for the indicating meter to indicate predetermined time constant values.

I claim as my invention:

1. Apparatus for measuring the time constant of an electrical network comprising a capacitor, connection means for a source of charging potential, means for selectively applying said potential to and for simultaneously removing said potential from said network and said capacitor, a discharge circuit for said capacitor, means selectively connected in shunt with said capacitor for indicating the electrical charge on said capacitor, and switching means responsive to the removal of said potential from said network for selectively disconnecting said discharge circuit from and for alternately connecting said indicating means to said capacitor to indicate said network time constant as a function of the residual charge on said capacitor.

2. Apparatus for measuring the delay time of an electrical network comprising a capacitor, connection means for a source of charging potential, means for selectively applying said potential to and for simultaneously removing said potential from said network and said capacitor, a resistive discharge circuit for said capacitor, means selectively connected in shunt with said capacitor for indicating the electrical charge on said capacitor, and switching means responsive to the removal of said potential from said network for selectively disconnecting said discharge circuit from and for alternately connecting said indicating means to said capacitor to indicate said network delay time as a function of the residual charge on said capacitor.

3. Apparatus for measuring the delay time of an electrical network comprising a capacitor, connection means for a source of charging potential, means for selectively applying said potential to and for simultaneously removing said potential from said network and said capacitor, a resistive discharge circuit for said capacitor, means for indicating directly the electrical charge on said capacitor, and electromagnetic switching means responsive to the removal of said potential from said network for selectively disconnecting said discharge circuit from and for alternately connecting said indicating means in shunt with said capacitor to indicate the effective delay time of said network and said electromagnetic switching means as a function of the residual charge on said capacitor.

4. Apparatus for measuring the time constant of an electrical network comprising a capacitor, connection means for a source of charging potential, means for selectively applying said potential to and for simultaneously removing said potential from said network and said capacitor, a thermionic discharge circuit for said capacitor, means for indicating directly the electrical charge on said capacitor, and thermionic tube switching means responsive to the removal of said potential from said network for selectively disconnecting said discharge circuit from and for alternately connecting said indicating means in shunt with said capacitor to indicate said network time constant as a function of the residual charge on said capacitor.

5. Apparatus for measuring the time constant of an electrical network comprising a capacitor, connection means for a source of charging potential, means for selectively applying said potential to and for simultaneously removing said potential from said network and said capacitor, a resistive discharge circuit for said capacitor, means selectively connected in shunt with said capacitor for indicating the electrical charge on said capacitor, and gaseous discharge tube switching means responsive to the removal of said potential from said network for selectively disconnecting said discharge circuit from and for alternately connecting said indicating means to said capacitor to indicate said network time constant as a function of the residual charge on said capacitor.

6. Apparatus of the type described in claim 5 including high gain polarity reversing amplifying means interposed between said network and said gaseous discharge tube.

7. Apparatus for measuring the time constant of an electrical network comprising a capacitor, connection means for a source of charging potential, switching means for selectively applying said potential to and for simultaneously removing said potential from said network and said capacitor, means comprising a resistive thermionic tube discharge circuit responsive to predetermined energization of said network for selectively discharging said capacitor, means selectively connected in shunt with said capacitor for indicating the electrical charge on said capacitor, and thermionic tube switching means responsive to said discharge circuit for selectively connecting said indicating means to said capacitor to indicate said network time constant as a function of the residual charge on said capacitor.

8. Apparatus for measuring the time constant of an electrical network comprising a capacitor, connection means for a source of charging potential, switching means for selectively applying said potential to and for simultaneously removing said potential from said network and said capacitor, means comprising a resistive thermionic tube discharge circuit responsive to predetermined energization of said network and supplied with energizing potential from said capacitor for selectively discharging said capacitor, means selectively connected in shunt with said capacitor for indicating the electrical charge on said capacitor, and thermionic tube switching means responsive to said discharge circuit for selectively connecting said indicating means to said capacitor to indicate said network time constant as a function of the residual charge on said capacitor.

DANIEL BLITZ.